United States Patent [19]
Johnston et al.

[11] 3,882,265
[45] May 6, 1975

[54] ELECTRICAL BUSWAY WITH IMPROVED JOINT CONSTRUCTION

[75] Inventors: Frank C. Johnston, Trumbull; Werner A. Krause, Plantsville, both of Conn.

[73] Assignee: General Electric Company, Schenectady, N.Y.

[22] Filed: May 3, 1974

[21] Appl. No.: 466,533

[52] U.S. Cl.......... 174/88 B; 174/68 B; 174/117 FF
[51] Int. Cl. ........................ H01r 5/02; H02g 15/08
[58] Field of Search..... 174/68 B, 72 B, 88 B, 99 B, 174/117 R, 117 FF, 88 S; 339/22 B

[56] References Cited
UNITED STATES PATENTS

| | | | |
|---|---|---|---|
| 2,437,358 | 3/1948 | Mowery | 174/88 S |
| 2,992,291 | 7/1961 | Kussy | 174/88 B |
| 3,383,458 | 5/1968 | Raskhodoff et al. | 174/88 B X |
| 3,407,263 | 10/1968 | Miller | 174/117 FF |
| 3,644,663 | 2/1972 | Carlson | 174/88 B |

*Primary Examiner*—Darrell L. Clay
*Attorney, Agent, or Firm*—Robert A. Cahill; Walter C. Bernkopf; Frank L. Neuhauser

[57] ABSTRACT

Plural busway sections each include flat, elongated, mutually insulated busbars in stacked assembly. The ends of the stacked busbars terminate in longitudinally staggered, complementary scarf lap joint halves. A housing having a base and a cover encloses the stacked busbars. A series of clamps press together corresponding busbar terminations of two sections aligned end-to-end to perfect scarf lap joints electrically interconnecting the sections. The base of one section and the cover of the other overlap to enclose the busbar joints.

12 Claims, 4 Drawing Figures

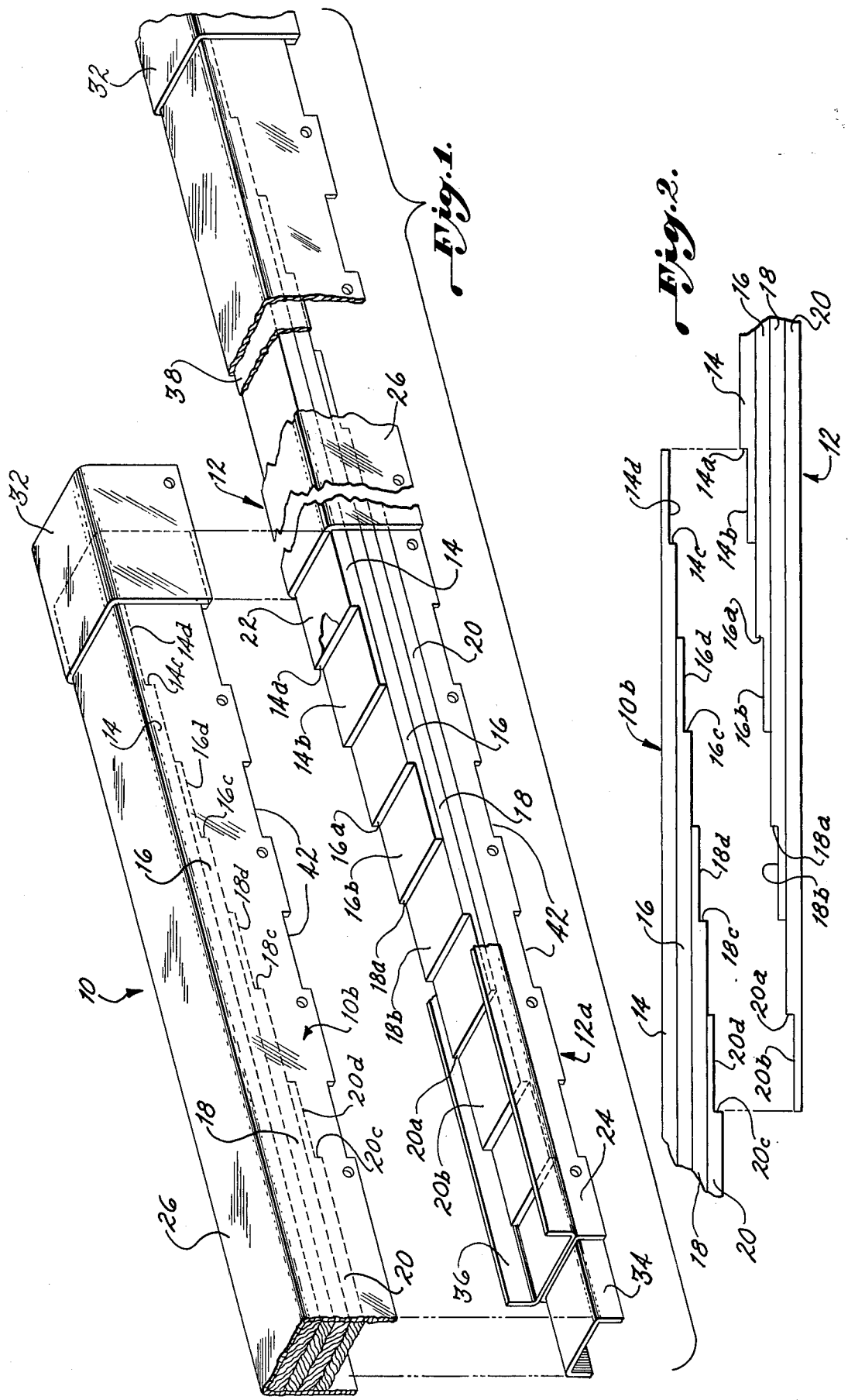

ELECTRICAL BUSWAY WITH IMPROVED JOINT CONSTRUCTION

BACKGROUND OF THE INVENTION

The present invention relates to electrical busway, and more particularly to a modular busway construction capable of being joined end-to-end in an efficient and practical manner to form long busway runs.

Feeder busway, to which the present invention is directed, is typically installed in industrial buildings and high rise office and apartment buildings to carry large amounts of current, ranging from 225 to 5,000 amperes. Feeder busway is almost invariably made up of a number of prefabricated, elongated modular sections joined end-to-end and suspended from ceilings or mounted as vertical risers. The installation of feeder busway is a difficult, cumbersome task, particularly in the higher current ratings, as busway sections can weigh as buch as 1,000 pounds. Prior art approaches to joining busway sections have typically called for interleaving the ends of the busbars of adjacent sections to form plural overlapping joints which are secured by one or more clamps. This approach necessitates that the terminal portions of the busbars exposed at each end of the busway section be formed to diverge laterally so as to provide prescribed interphase electrical clearances. This lends to a rather bulky joint which often presents problems in the close confines of a typical installation. Moreover, the joint clamp must also include insulating elements to provide adequate electrical insulation between phases.

The physical maneuvering and positioning of busway sections incident to joining is an extremely difficult operation. To effect the requisite interleaving of the busbar terminations, one of the two busway sections to be joined must be moved laterally into its ultimate end-to-end position relative the other. This maniuplation can present difficult installation problems where adequate space is not available to "side slip" a busway section into position. This is particularly so of riser columns where lateral movement of the busway sections is constrained by the holes in the floors through which the busway must extend. It will be appreciated that the replacement of a busway section is an equally challenging task.

To overcome these installation problems, special splice joint clamps have been devised to electrically connect non-interleaved busbars of adjacent busway sections. The joints, while simplifying installation, are necessarily elaborate in design and thus quite expensive.

Yet another problem plaguing prior art busway systems is that of adequately sealing the busway and particularly the joints against the entry of dust and water. It will be appreciated that the entry of such foreign agents can precipitate faults.

OBJECTS OF THE INVENTION

It is accordingly an object of the present invention to provide improved electrical busway.

Another object is to provide electrical busway of the above character which is easier to install and maintain.

Still another object is to provide electrical busway of the above character wherein the modular sections thereof are designed for electrical and physical joining end-to-end in a convenient and efficient manner.

A further object of the invention is to provide electrical busway of the above character which is efficiently sealed against the entry of foreign substances.

Yet another object is to provide electrical busway of the above character which is compact, reliable and relatively inexpensive to manufacture.

Other objects of the invention will in part be obvious and in part appear hereinafter.

SUMMARY OF THE INVENTION

In accordance with the present invention there is provided improved electrical busway consisting of plural, elongated busway sections electrically joined end-to-end. Each section includes plural, elongated, mutually insulated busbars of rectangular configuration arranged in stacked relation. A housing consisting of a base and a cover encloses the stacked busbars over substantially their entire length to prevent entry of foreign substances. The plural busbars at one end of each busway section terminate in a staggered longitudinal array of scarf lap joint halves and at the other section end in a staggered longitudinal array of complementary scarf lap joint halves. The base is cut back at one end of a busway section to expose the busbar terminations thereat, while the cover is cut back at the other busway section and to expose the busbar terminations thereat. Thus, when two busway sections are aligned in the proper end-to-end relation, the registered busbar terminations of the two sections interfit to form complete scarf lap joints. Moreover, the cover extension of one section cooperates with the base extension of the other to provide continuity from section to section in the housing enclosing the stacked busbars. Suitable clamps, surrounding the cooperating cover and base extensions, exert contact pressure on the plural scarf lap joints to achieve positive electrical connection between corresponding busbar terminations of adjacent busway sections.

The invention accordingly comprises the features of construction and arrangement of parts which will be exemplified in the construction hereinafter set forth, and the scope of the invention will be indicated in the claims.

DESCRIPTION OF THE DRAWING

For a fuller understanding of the nature and objects of the invention, reference should be had to the following detailed description taken in connection with the accompanying drawing in which:

FIG. 1 is a perspective view, partially broken away, of electrical busway constructed in accordance with the present invention;

FIG. 2 is a diagrammatic view illustrating the scarf lap joints created between the busway sections of FIG. 1;

Like reference numerals refer to like parts throughout the several views of the drawings.

DETAILED DESCRIPTION

The electrical busway of the present invention is made up of plural, identically constructed busway sections formed in modular lengths of, for example, ten feet and joined end-to-end. FIG. 1 is a fragmentary perspective view of two such busway sections 10 and 12. Each busway section includes plural, side-by-side busbars of rectangular cross-section for accommodating polyphase power distribution. Thus, as seen in FIG. 1, each illustrated busway section includes corresponding busbars 14, 16 and 18 for three phase power distribution and a neutral bus bar 20.

The individual busbars are wrapped with insulating tape or otherwise coated with insulation 22 to electrically insulate the stacked busbars of a busway section one from the other.

Figure 4:
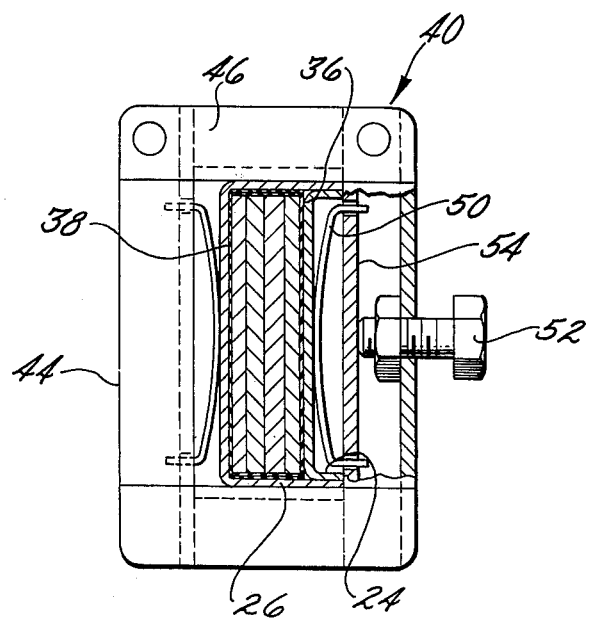
FIG. 4 is sectional view taken along line 4—4 of FIG. 3.

Each busway section is enclosed substantially along its entire length by a housing consisting of an elongated U-shaped base 24 and an elongated U-shaped cover 26. As best seen in FIG. 4, the stacked busbars are enclosed between the side skirts of the cover and the bridging sections of the cover and base.

Intermediate the ends of the sections, the cover and base are joined where their side skirts overlap, preferably by a continuous seam weld to seal the enclosed busbar stack from the entry of water, dust, etc. In the manner disclosed in U.S. Pat. No. 3,384,702, the bridging sections of the base and cover may be preformed in convergently bowed configurations, such that, upon assembly of the housing, the individual busbars are pressed together by the bridging sections to insure good thermal contact between busbars and between the busbars and the housing so that the busway will run cool. Moreover this prestressing of the busbar stack increases the ability of the housing to withstand short circuit current forces.

At one end of each busway section, for example end 12a of section 12, the cover 26 is cut back or foreshortened so as to terminate short of the section end, thus to expose the terminal portions of the busbars. The busbars are formed to terminate in a longitudinally staggered array of scarf lap joint halves. Thus, as seen in FIG. 1, busbar 20 terminates closest to the left end of busway section 12 in a scarf lap joint half 20a to present an upwardly facing electrically conductive surface 20b. Inwardly of scarf lap joint half 20a, busbar 18 terminates in a scarf lap joint half 18a to present an upwardly facing conductive surface 18b. Similarly, busbars 16 and 14 terminate in longitudinally spaced scarf lap joint halves 16a and 14a, presenting upwardly facing conductive surfaces 16b and 14b, respectively.

At the right end of each busway section, ends 10b and 12b as depicted in FIG. 1, the base 24 is cut back or foreshortened to expose the right terminal portions of busbars 14, 16, 18 and 20 which terminate in correspondingly longitudinally staggered complementary scarf lap joint halves 14c, 16c, 18c and 20c to present downwardly facing conductive surfaces 14d, 16d, 18d and 20d.

To join busway sections, the right terminal portion of one section, for example, terminal portion 10b of section 10, is overlapped with the left terminal portion of another section, terminal portion 12a of section 12 in the illustrated example. As best illustrated in the diagrammatic showing of FIG. 2, the scarf lap joint terminations of corresponding busbars of the two sections interfit to bring the conductive surfaces thereof into mutual electrically contacting engagement. Thus, the scarf lap joint halves 14a and 14c at the terminations of busbars 14 of the two busway sections interfit to produce surface to surface contact between conductive busbar surfaces 14b and 14d. Likewise, the respective joint halves at the terminations of busbars 16, 18, and 20 of the two sections interfit to provide electrical continuity for these busbars from section to section.

The extension of the housing cover 26 at the right end of each busway section fits over the extension of base 24 at the left end of each busway section to enclose the staggered array of scarf lap joints, thus to provide housing continuity from busway section to busway section. The cover and base extensions are secured to suitable means, such as metal screw 30 (FIG. 3), to seal the joint area against the entry of foreign substances. A U-shaped splice plate 32 mounted at the end of the cover extension of busway section 10 overlaps the cover of section 12 to seal the seam between section covers. Similarly, a U-shaped splice plate 34 is mounted at the end of the base extension of busway section 12 to seal the seam between section bases. To insulate the busbar joints from the housing, an elongated, channel-shaped member 36, formed of insulative material, is incorporated in the left end of each busway section, while a similarly structured insulative member 38 is incorporated in the right end of each section. Member 36 has a base portion underlying the stacked busbars of section 12 at least in the joint region and upstanding sides extending along the edges of the busbars, again at least in the joint region. Member 38 similarly has a base portion overlying the stacked busbars of section 10 and depending sides which lap the sides of member 36 when the busway sections are joined. These insulative members serve to electrically isolate from the busway section housing the open seams of the busbar joints where conductive metal is exposed.

Figure 3:
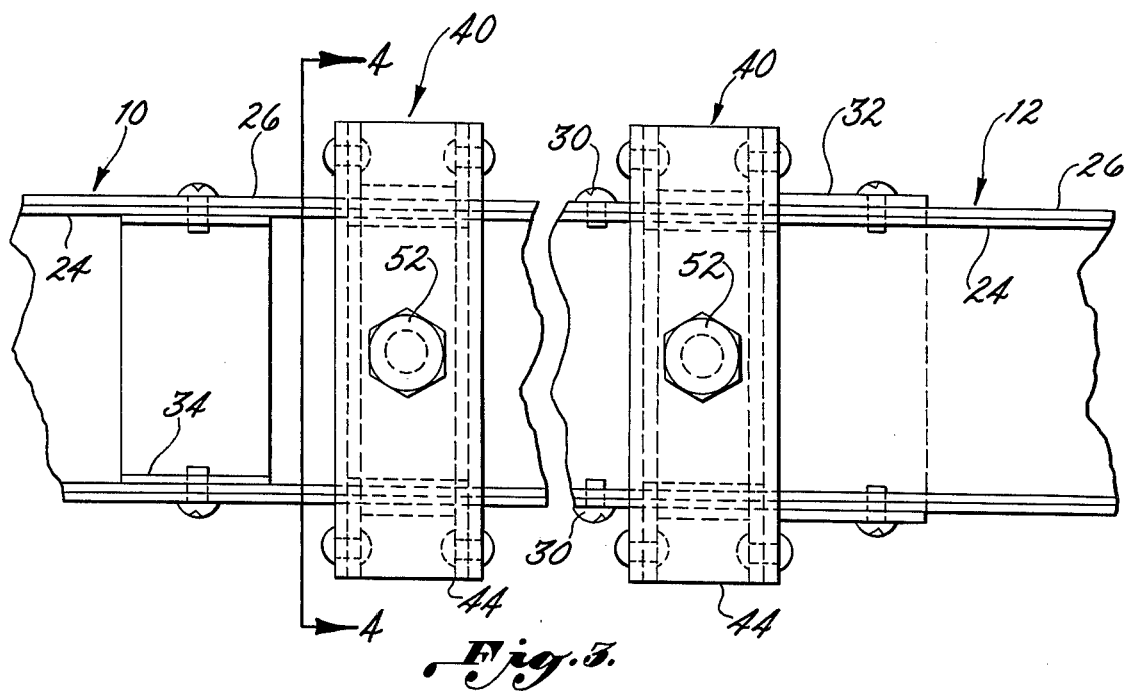
FIG. 3 is a plan view, partially broken away, of the joint between the busway sections of FIG. 1.

To insure adequate contact pressure at the several busbar joints, clamps, generally indicated at 40 in FIGS. 3 and 4, are provided in embracing relation with the busway. As seen in FIG. 1, the skirts of the base and cover extensions are notched, as indicated at 42, to accommodate a separate clamp 40 at the location of each busbar joint. It will be appreciated that fewer than four clamps may suffice for some installations. The clamps 40, which may take various forms, are illustrated for purposes of the present disclosure as comprising an open rectangular frame 44, best seen in FIG. 4. One of the frame sides, for example the side indicated at 4b, is pivotally mounted at 47 to swing open and thus permit the clamp to be positioned about the busway. Frame side 46 is then pivoted closed and suitably latched to fully embrace the busway in registry with one of the busbar joints. The clamp frame 44 mounts opposed springs 48 and 50 which operate against the lapped cover and base extensions of joined busway sections. A clamping bolt 52, mounted by the frame 44, is advanced to move a pressure plate 54 inwardly, thereby compacting the springs which, in turn, impart distributed pressure against the cover and base extensions to insure adequate contact pressure on the engaged conductive surfaces of the busbar joints.

From the foregoing description, it is seen that the present invention provides electrical busway wherein modular busway sections can be joined in an efficient and practical manner. Interleaving of the plural busbar terminations of adjacent busway sections is avoided along with the accompanying difficult task of maneuvering one of the sections into alignment from the side. By virtue of the instant invention, the section need only be maneuvered to simply lap their terminal portions, thereby automatically mating the prefabricated scarf lap joint terminations at the ends of the corresponding busbars of adjacent busway sections. The longitudinal staggering of these busbar terminations avoids the interleaving of busbar terminations common in prior art approaches. The spacing between busbar terminations is not increased, thus contributing to a compact busway joint. The lapping of housing member extensions provides housing continuity from section to section, and substantial imperviousness to foreign substances, especially in the joint region. Moreover, thermal contact of housing extensions with the joined busbar terminations insures a cool busway joint.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described our invention, what we claim as new and desire to secure by letters Patent is:

1. Electrical busway comprising, in combination:
   A. plural busway sections, each including
      1. a plurality of flat, elongated busbars arranged in stacked relation, corresponding one ends of said busbars formed with scarf lap joint terminations arrayed in longitudinally staggered relation and corresponding other ends of said busbars formed with complementary scarf lap joint terminations likewise arrayed in longitudinally staggered relation,
      2. insulation insulating said busbars one from the other, said busbar terminations being devoid of said insulation, and
      3. a housing enclosing said stacked busbars along the mid lengths thereof intermediate said busbar terminations,
      4. said busway sections aligned in appropriate end-to-end relation with said scarf lap joint terminations of corresponding ones of said busbars in said aligned sections mating to effectuate electrical connections therebetween; and
   B. means maintaining said busbar electrical connections between said aligned busway sections.

2. The electrical busway defined in claim 1, wherein said housing of each busway section includes:
   1. an elongated base overlapping said busbar terminations at one end of said busway section and terminating short of said busbar terminations at the other end of said section, and
   2. an elongated cover terminating short of said busbar terminations at said one end of said busway section and overlapping said busbar terminations at said other end of said busway section,
   3. the overlapping portion of said base at said one end of one aligned section laps the overlapping portion of said cover at said other end of the other aligned section providing housing continuity from section to section.

3. The electrical busway defined in claim 2, which further includes means joining said lapped extending portions of said base and cover.

4. The electrical busway defined in claim 3, wherein said maintaining means comprises a plurality of clamps arranged in longitudinally spaced, embracing relation with said lapped extending portions of said base and cover.

5. The electrical busway defined in claim 3, which further includes splice plates secured to said busway sections covering the seams between said bases and between said covers of said aligned busway sections.

6. The electrical busway defined in claim 2, which further includes insulation means insulating said busbar terminations from said extending portions of said cover and base.

7. The electrical busway defined in claim 2, wherein said cover is U-shaped in cross-section having a bridging portion and opposed side skirts enclosing three sides of said stacked busbars, and said base is also U-shaped in cross-section having a bridging portion enclosing the fourth side of said stacked busbars and opposed side skirts, the marginal portions of said cover side skirts overlapping and secured to said base side skirts to complete said housing.

8. An electrical busway section comprising, in combination:
   A. a plurality of flat, elongated busbars arranged in stacked relation, corresponding one ends of said busbars formed with scarf lap joint terminations arrayed in longitudinally staggered relation and the corresponding other ends of said busbars formed with complementary scarf lap joint terminations likewise arrayed in longitudinally staggered relation;
   B. insulation insulating said busbars one from the other, said busbar terminations being devoid of said insulation, and
   C. a housing enclosing said stacked busbars along the mid lengths thereof intermediate said busbar terminations, said housing including
      1. an elongated base overlapping said busbar terminations at one end of said busway section and terminating short of said busbar terminations at the other end of said section, and
      2. an elongated cover terminating short of said busbar terminations at said one end of said busway section and overlapping said busbar terminations at said other end of said busway section;
   D. whereby, upon alignment of two busway sections in appropriate end to end relation, said scarf lap joint terminations of corresponding ones of said busbars in the aligned sections mate to effectuate electrical connections therebetween.

9. The busway section defined in claim 8, wherein coextensive portions of said cover and said base are joined by continuous seam welds.

10. The busway section defined in claim 9, wherein said cover is U-shaped in cross-section having a bridging portion and opposed side skirts enclosing three sides of said stacked busbars, and said base is also U-shaped in cross-section having a bridging portion enclosing the fourth side of said stacked busbars and opposed side skirts, said continuous seam welds being effectuated where the marginal portions of said cover side skirts overlap said base side skirts.

11. The electrical busway defined in claim 8, which further includes insulating members interposed between said stacked busbars and the extending portions of said base and cover.

12. The electrical busway defined in claim 11, which further includes a first splice plate mounted by and extending beyond the extending portion of said base, and a second splice plate carried by and extending beyond the extended portion of said cover.

* * * * *